UNITED STATES PATENT OFFICE.

CHARLES J. TINNERHOLM, OF QUINCY, ILL., ASSIGNOR TO JOHN C. WHITE.

IMPROVEMENT IN THE MANUFACTURE OF LEATHER.

Specification forming part of Letters Patent No. 123,748, dated February 13, 1872; reissue No. 5,301, dated February 25, 1873.

*To all whom it may concern:*

Be it known that I, CHARLES J. TINNERHOLM, of the city of Quincy, in the county of Adams and State of Illinois, have invented certain new and useful Compositions to be used in Liming, Bating, Tanning, and Whiting Leather, of which the following is a specification:

*Nature and Objects of the Invention.*

The invention relates to the manufacture of leather by the four processes of liming, bating, tanning, and whiting, using the various chemical agents in the manner hereinafter indicated; the object of the invention being to provide certain compositions, used in the order hereinafter set forth, and having a relation to each other, by the use of which a leather of superior quality is manufactured with less danger of injury to the hide than by any known process.

*General Description.*

The following description of the invention is based upon an estimate of one hundred pounds (100 lbs.) of skins or hides. The invention consists in successive processes distinct in themselves, each nevertheless having a relation to the succeeding process, being therefore mutually co-operative in producing the general result. The processes are four in number, viz., liming, bating, tanning, and whiting, and will be described in the order above in which they are employed.

*Liming Process.*

One-eighth ($\frac{1}{8}$) of a bushel of lime is dissolved in water, which solution is poured into a vat containing a proper quantity of water to cover the skins; one-third of a pound ($\frac{1}{3}$ lb.) of sal soda is dissolved by boiling it in a sufficient quantity of water, and this solution is also poured into the vat, in which is also placed two ounces (2 oz.) chloride of ammonium. The ingredients are then thoroughly mixed, and the skins or hides deposited in the liquor and allowed to remain therein three (3) days; they are then taken out, the hair removed; then they are placed in a vat of fresh water for one (1) day; then taken out, and the adhering flesh or lime removed from them. The skins are now ready for the process of bating.

The liming process employs the following ingredients: Water, lime, sal soda, and chloride of ammonium. The sal soda used should be distinguished from soda-ash. The chloride of ammonium employed is in crystallized form. In the place of the last-named ingredient, eight pounds (8 lbs.) of gas-ammonia may be used, as this hastens the operation and strengthens the leather. This gas-ammonia is obtained from gas-works, and is sometimes denominated "gas-water." It is poured into the vat when used as a substitute for the chloride of ammonium.

*Bating Process.*

The bating process immediately succeeds that of liming.

Four ounces (4 oz.) of brimstone and four ounces (4 oz.) of potash (or lye of ashes) are boiled together in a sufficient proportion of water to dissolve them; this solution is poured into a vat containing a proper quantity of water to cover the skins; dissolve four ounces (4 oz.) sal soda in warm water, and pour this solution into the vat; add to the contents of the vat two ounces (2 oz.) chloride of ammonium, (or a like proportion of gas-ammonia;) mix the ingredients thoroughly; deposit the skins, and allow them to remain in the vat for one (1) day; take out the skins and remove the adhering lime. The skins are now ready for the process of tanning.

The bating process employs water, brimstone, potash, (or lye of ashes,) sal soda, chloride of ammonium, (or gas-ammonia.) The sal soda used in this process should be distinguished from soda-ash; also, the manner of using the brimstone and potash (or lye of ashes) should be noted as other than the simple employment of sulphur.

*Tanning Process.*

The tanning process immediately succeeds that of bating.

The vat being supplied with a sufficient quantity of water to cover the skins, place therein two ounces (2 oz.) pyroligneous acid; one (1) gallon of lye of ashes of proper strength, or three ounces (3 oz.) potash dissolved by boiling in one-eighth ($\frac{1}{8}$) gallon of water; ten pounds (10 lbs.) terra japonica dissolved by boiling in four (4) gallons water; mix the ingredients thoroughly; then deposit the skins in the vat, and leave them from eight (8) to eighteen (18) days therein. The skins are now ready for the process of whiting.

The tanning process employs the following ingredients: Water, pyroligneous or acetic acid, lye of ashes, (or its equivalent,) and terra japonica. Ten pounds (10 lbs.) of hops may be substituted for the pyroligneous or acetic acid.

*Whiting Process.*

The whiting process immediately follows that of tanning.

A sufficient quantity of water being placed in the vat, place therein two pounds (2 lbs.) salt and four ounces (4 oz.) sulphuric acid; deposit the skins in the vat, allowing them to remain one (1) day, then remove the skins and immerse them in a vat of clear water, after which they are ready to dry.

The whiting process employs the following ingredients: Water, salt, and sulphuric acid. In addition to these ingredients, one pound (1 lb.) brimstone dissolved with three ounces (3 oz.) potash by boiling in one (1) gallon water may be employed when it is desired to have the leather very white.

The liming composition may be renewed by adding to the liquor in the vat one-fourth ($\frac{1}{4}$) the quantity of ingredients first used and ten (10) gallons of water, with a like proportion of ingredients to every one hundred (100) gallons in the vat. The bating liquor may be renewed by adding to the liquor in the vat similar proportions of ingredients, and water to those used in the liming liquor. The tanning liquor may be renewed by adding to the liquor in the vat one-half ($\frac{1}{2}$) the quantity of ingredients first used, and a like proportion of water and ingredients to those used in renewing the liming liquor. The whiting liquor may be renewed in a manner similar to the tanning, except that there is added to the liquor in the vat the proportion of one-eighth ($\frac{1}{8}$) of ingredients.

The proportions given in the foregoing are relative; a slight variation will not affect the operation of the compositions.

*Claims.*

What I claim as my invention, and desire to secure by Letters Patent, is—

1. The process of liming hides or skins by means of the combination and use of lime, sal soda, chloride of ammonium, and water, in the manner substantially as herein specified.

2. The process of bating hides or skins by means of the combination and use of brimstone, potash, water, sal soda, and chloride of ammonium, in the manner substantially as herein set forth.

3. The manufacture of leather by means of the several successive processes of liming, bating, tanning, and whiting, employing the ingredients and used in the relations substantially as described and stated.

4. Gas-ammonia or gas-water, when used in the manufacture of leather.

5. Chloride of ammonia, when used in the process of liming hides.

6. Combination of brimstone and potash in process of bating hides.

CHARLES J. TINNERHOLM.

Attest:

THOS. T. WOODRUFF,
W. G. EWING.